June 24, 1930.  W. KUCZORRA  1,768,409
ADVERTISING DEVICE
Filed Oct. 24, 1929  2 Sheets-Sheet 1
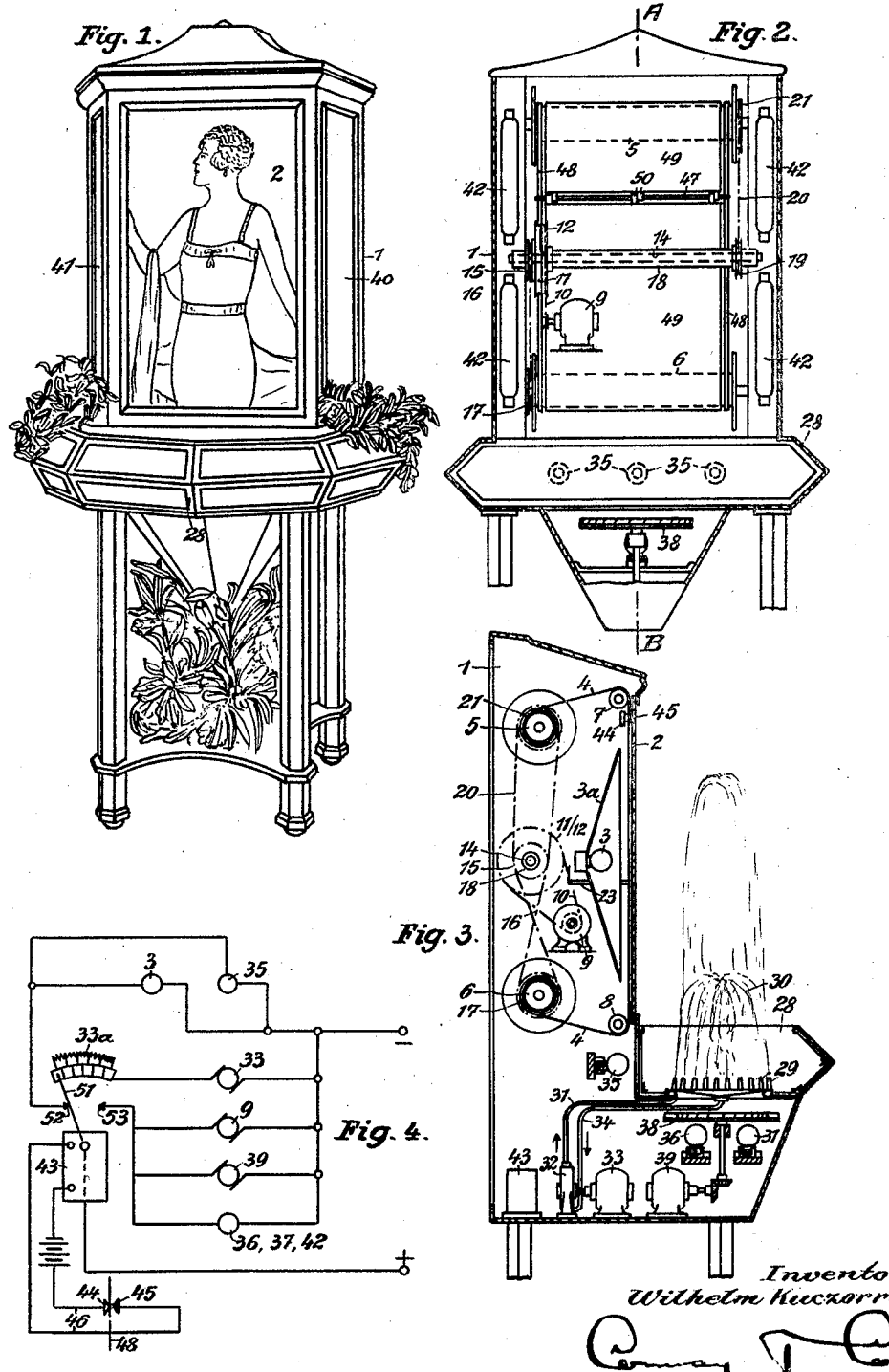

June 24, 1930. W. KUCZORRA 1,768,409
ADVERTISING DEVICE
Filed Oct. 24, 1929   2 Sheets-Sheet 2
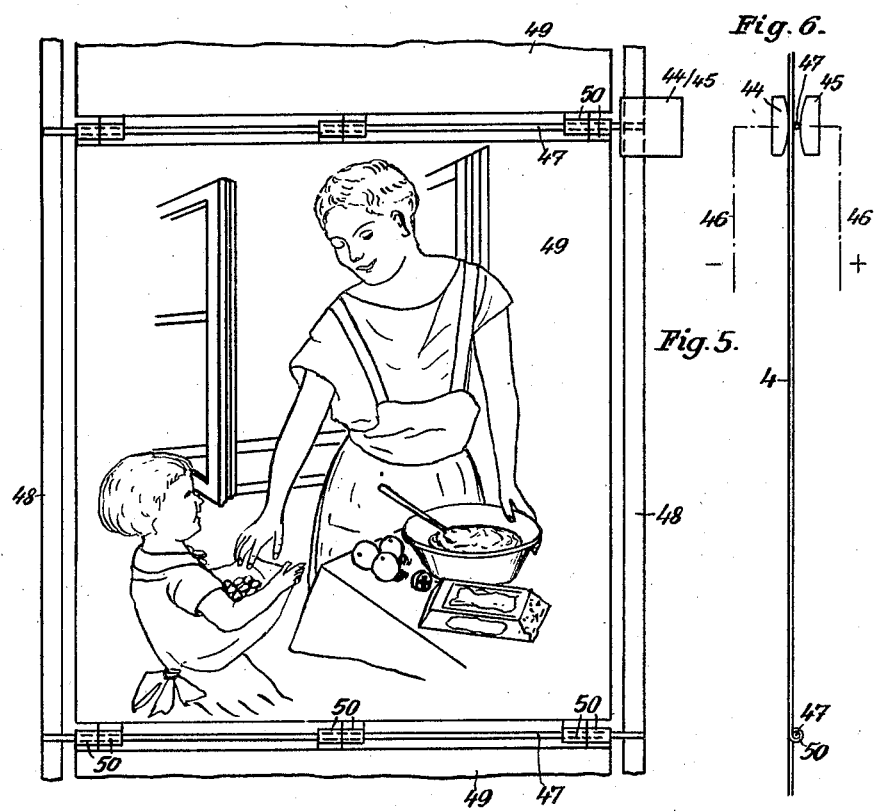
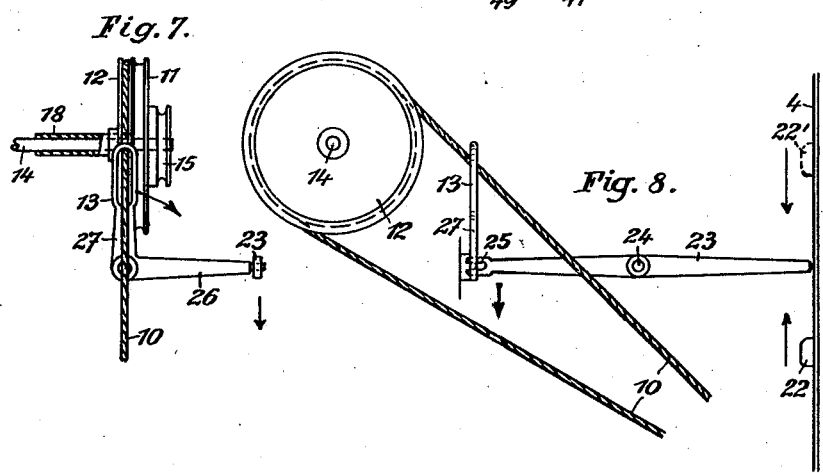
Inventor:
Wilhelm Kuczorra,
Atty.

Patented June 24, 1930

1,768,409

UNITED STATES PATENT OFFICE

WILHELM KUCZORRA, OF BERLIN, GERMANY

ADVERTISING DEVICE

Application filed October 24, 1929, Serial No. 402,283, and in Germany October 19, 1927.

This invention relates to an advertising device, in which a member, preferably a band, bearing advertisements, inscriptions or pictures, is intermittently made visible behind a transparent mirror illuminated intermittently from behind, and in which a fountain is arranged in front of said mirror, the jets of the fountain being also intermittently illuminated. Illuminating the fountain and the mirror is effected alternately, that is to say, the fountain is not illuminated when the advertisements are illuminated, and conversely. Switching on and off the lamps for illuminating the mirror from behind, and the fountain in front of the mirror, is effected by means of a time switch which is actuated automatically by one of the main members of the advertising device, preferably by the band bearing the advertisements, the band being then provided with contact-closing members, and said switch may serve not only for switching on and off said lamps, but also for controlling the intermittent movements of said band. This latter is stopped as long as it is visible behind the transparent mirror, and is again moved during those periods of the time in which it is invisible, the extent of this movement being always such that the next advertisement takes the place of the preceding one behind the mirror. While the advertising band is invisible, the fountain is illuminated.

Another part of the invention consists in regulating the height of the fountain jets depending on the visibility or invisibility of the advertisements, in such a manner that the jets are comparatively low when the advertisements are visible, and are comparatively high when the advertisements are invisible, that regulation being also effected by means of the time switch.

The invention is illustrated diagrammatically and by way of example in the accompanying drawing in which Figure 1 is a perspective representation of an advertising device designed according to this invention; Figure 2 is a rear-view of the device, the rear wall of the casing being removed; Figure 3 is a section in the plane A—B of Fig. 2; Figure 4 is a representation of the wiring diagram; Figures 5 and 6 show parts of the advertising band, in connection with the contact-closing means for the time switch, these figures being drawn to an enlarged scale; and Figs. 7 and 8 are views of the automatic change-over device for the advertising band, also these figures being drawn to an enlarged scale.

On the drawing, 1 denotes the casing in which all members of the apparatus are housed. The front face of the casing 1 is formed by a transparent mirror 2 which acts as a mirror as long as it is not illuminated from behind. 3 denotes a source of light, preferably and generally an electric incandescent lamp, which is arranged behind said mirror. Said lamp 3 is arranged in the centre of a reflector $3^a$, with the aid of which the light is distributed over the entire area of the rear face of the mirror.

Through the space between the mirror and the reflector extends the band 4 which bears the advertisements, one of which is shown in Fig. 5. The ends of the band 4 are secured to two cylinders 5 and 6, of which one is located in the upper portion of the casing 1, the other in the lower portion of the same. The band is conducted over guide cylinders 7 and 8, as shown in Fig. 3, and it is moved downwardly or upwardly, as the case may be, by means of an electromotor 9 driving, by means of a cord (or belt) 10, either a cord (or belt) pulley 11 (Fig. 7) or a cord (or belt) pulley 12, according to the position of a bell-crank lever 26/27, the arm 27 of which is designed as a guide loop for said cord. The means for actuating said bell-crank lever will be described hereinafter.

The cord pulley 11 is affixed to a shaft 14, to which is secured also a smaller cord pulley 15 located at the side of the pulley 11. The pulley 12 is affixed to a hollow shaft 18 enclosing the solid shaft 14. The lower band cylinder 6 is firmly connected with a rope pulley 17, and this pulley and the pulley 15 are connected with one another by a crossed cord 16. At the other end of the hollow shaft 18 is located a cord pulley 19, and connected with the upper band cylinder 5 is a pulley 21 which is connected by a cord 20 with the pulley 19. Thus, according as the cord 10 drives the pulley 11 or the pulley 12 the band 4 is moved in the one or the other direction, i. e., from the cylinder 5 to the cylinder 6, or reversely.

The reversal at either end of the band is effected automatically. There is provided near each of the two ends of the band a projection 22 (Fig. 8) and 22' (this latter being drawn in dotted lines). When the band has nearly completely been wound off the one or the other cylinder, the one or the other of said projections, as the case may be, leaves the respective cylinder and contacts very soon thereafter with one end of a double-armed lever 23 fulcrumed at the point 24 and engaging at its other end 25 the arm 26 of the bell-crank lever 26/27 whereby this lever is so turned that the cord 10 is shifted to the other of the two pulleys 11 and 12 whereby the direction of movement of the band 4 is reversed.

Below the casing 1, around the front half of the same, is a basin 28 (Figs. 1–3) in which are nozzles 29 from which rise jets 30. The water is supplied to the nozzles 29 through a pipe 31 by means of a rotary pump 32 driven by a small electromotor 33. The height of the jets 30 depends upon the number of revolutions of the blades of the pump. The water falling down, and back into the basin, is reconducted to the pump through the pipe 34.

The bottom and the lateral walls of the basin consist of glass, and below this bottom are provided incandescent lamps 35, 36, and 37. Between these lamps and said bottom is a rotary glass disk 38 rotated by an electromotor 39 and composed of differently colored segments so that the jets of the fountain are colored, i. e. differently colored, while they are produced. It is obvious that the color of the jets continually changes whereby a striking effect is produced.

Laterally from the two sides of the front plate 2, obliquely arranged mirrors 40 and 41 are provided, behind which are arranged electric illuminating bodies 42 illuminating said mirrors from behind. Also behind these mirrors, that is to say, between them and the illuminating bodies 42, advertisements may be provided which may be either stationary or movable.

The band 4 with the advertisements thereon is moved intermittently, and also the lamps 3, 35, 36, 37, and 42 are switched on and off intermittently, as is also the motor 33. In the wiring diagram Fig. 4, 43 denotes the time switch which is of known design. In it is provided a clock-work by which the points of time in which the several circuits are closed and opened is determined. The time switch is operated by the band 4. For this purpose stationary contacts 44 and 45 (Figs. 3 and 6) are provided which cooperate with, and are conductively connected with one another by, metallic rods 47 (Figs. 5 and 6) extending across the band 4. The contacts 44 and 45 are connected with the time switch by wires 46, and the time switch circuit is closed when any one of the various rods 47 passes through between said contacts 44 and 45. The rods 47 are located between the successive advertisements which may be of different length, just as required, and the time switch is, thus, actuated always when the band 4 has been moved by so much as corresponds to the length of an advertisement. The ends of the rods 47 are conductively connected with metallic strips 48, the length of which corresponds to the entire length of the band 4. The strips 48 and the rods 47 form fields, and the advertisements are arranged in these fields. They are secured in place therein by means of small hooks 50 (Fig. 5) engaging the rods 47. In this way it is rendered possible to exchange the advertisements easily and conveniently.

As soon as any one of the rods 47 arrives between the contacts 44 and 45 the switch 43 is so actuated that the motors 9 and 39, as well as the lamps 36, 37, and 42, are switched off, whereas the lamps 3 and 35 are switched on. Besides, the resistance 33$^a$ (Fig. 4) is, in its entirety, inserted into the circuit of the motor 33. The advertisement just present behind the mirror 2 can now be seen through this mirror, whereas the advertisements located behind the lateral mirrors 40 and 41 are invisible and also the jets of the fountain are not illuminated. The height of the jets is only low at this time so that the advertisement behind the mirror 2 can be distinctly seen. The pump motor 33 is running only slowly as the resistance 33$^a$ has been completely inserted into the pump motor circuit. This state of the resistance is illustrated in fig. 4, in which the resistance lever 51 contacts with the contact 52. The — —pole and the+ —pole at the right-hand side of fig. 4 are the points where the entire set of circuits is to be connected with the line. The lever 51 remains in its position as long as the released wheel-work of the time switch is running, but when this wheel-work ceases to run the spring (not shown) of the time switch turns the lever 51 from the left to the right so that it contacts with the contact 53, in consequence whereof the lamps 3 and 35 are switched off and the lamps 36, 37, and 42, as well as the motors 9 and 39, are switched on. Simultaneously therewith also the resistance 33$^a$ has been switched off, that is to say, has been disconnected from the circuit of the motor 33 so that this motor is now running with full speed.

Disconnecting the time switch from the line after the wheel-work has come to standstill can be effected without difficulty as the pin 47 which had effected the switching on of the time switch had left the contacts 44 and 45 prior to the stopping of the advertising band in spite of the switching off of the motor 9. That is due to the fact that the band, owing to the inertia of the parts concerned does not come to a standstill instantly after the switching off of the motor 9 but moves a little further onward.

The effect of the second change-over of the circuits concerned is this that the band portion located, at the time being, behind the mirror 2 becomes invisible, whereas the advertisements located behind the lateral mirrors become visible in that they are illuminated at this time. Also the jets 30 which have their full height at this time are illuminated, the light of the lamps 35, 36, 37 passing always through the rotating colored disk 38. The greater height of the jets at this time is due to the resistance 33ª having been switched off, when the lever 51 was moved from the left to the right, as already stated. And as also the motor 9 has been switched on, also the advertising band is running (but cannot now be seen through the mirror 2) until the next rod 47 contacts with the contacts 44 and 45, that is to say, when the next advertisement has completely arrived behind the mirror 2. Now the circuit 46 is again closed, the time switch 43 is again changed over, and the operations described in the preceding paragraphs are repeated.

The effect of this advertising apparatus upon the beholders and upon the persons passing by is very great; all these persons are intensely attracted by the variations in the operation, especially by the illuminating effects, and the effect of the advertisements proper is greatly increased thereby. Another advantage is this that the jets of the fountain moisten and cool the air in the room etc. where the apparatus has been put up.

Finally, I wish it to be understood that I do not limit myself to all details of the apparatus, of which merely a constructional form has been shown by way of example. Departures in the details are possible, without departing from the gist of the invention. To give an example in this respect it is possible to employ only one motor instead of the three shown in the drawings, and to provide for that one motor automatically controllable couplings and the like, by which the various parts to be driven in accordance with the invention are thrown into, and out of, gear in their proper change and succession.

I claim:

1. An advertising device, comprising, in combination, a casing, a mirror in the casing wall, a movable support adapted to hold advertisements behind said mirror, means for moving said support, lamps arranged behind the mirror, a fountain basin at said casing, the walls of the same consisting partly of glass, jet-producing nozzles in said basin, a water pump, a pipe connecting said pump with said nozzles, a motor for driving said pump, lamps behind the glass walls of the fountain basin, and a time switch so designed as to be adapted to switch on and off periodically and alternately the lamps behind the said mirror and the lamps behind the fountain basin glass walls, as well as the means for moving the advertisement support.

2. An advertising device, comprising, in combination, a casing, a mirror in the wall thereof, an advertising band, means for driving said band, lamps behind said mirror, a fountain basin at said casing, the walls of said basin consisting partly of glass, jet-producing nozzles in the basin, a water pump, a pipe connecting said pump with said nozzles, lamps behind the fountain basin glass, and a time switch so designed as to be adapted to switch on and off periodically and alternately the lamps behind the said mirror and the lamps behind said basin glass walls, as well as the motor for operating the advertising band.

3. An advertising device, comprising, in combination, a casing, a mirror in a wall of said casing, a carrier for advertisements located behind the mirror, a fountain basin at said casing, the walls of said basin consisting partly of glass, jet-producing nozzles in said basin, a water pump, a pipe connecting said pump with said nozzles, a motor for driving said pump, a variable resistance in the circuit of said motor, lamps behind the glass walls of the fountain basin, and a time switch so designed as to be adapted to switch on and off periodically and alternately the lamps behind the said mirror and the lamps behind the fountain basin glass walls, as well as the driving motor for the advertising carrier and to control the said resistance.

4. An advertising device, comprising, in combination, a casing, a mirror in a wall of the casing, a carrier for advertisements behind said mirror, means for driving said carrier, lamps behind the said mirror, a fountain basin arranged at the said casing and having walls consisting partly of glass, jet-producing nozzles in said basin, a water pump, a pipe connecting said pump with said nozzles, a motor for driving the pump, lamps behind said basin glass walls and below the bottom of the basin, a multi-colored glass-disk between said basin bottom and the lamps therebelow, means for driving said glass-disk, a time-switch so designed as to be adapted to switch on and off periodically and alternately the lamps behind the said mirror and the lamps behind the basin walls, as well as the driving motor for the advertising carrier.

5. An advertising device, comprising, in combination, a casing, a mirror in the front-wall thereof, mirrors in the adjacent walls, lamps behind said mirrors, a carrier for advertisements behind the first-mentioned mirror, means for operating said carrier, a partly transparent fountain basin at the casing and jet-producing nozzles therein, a water pump and a pipe connecting it with said nozzles, lamps behind the transparent parts of said basin, and a time switch so designed as to be adapted to switch on and off periodically and alternately the lamps located behind the front mirror, the lamps located behind the lateral mirrors, and those behind the transparent fountain basin parts, as well as the operating means of the advertisement carrier, substantially as set forth.

In testimony whereof I affix my signature.

WILHELM KUCZORRA.